(12) United States Patent
Kim et al.

(10) Patent No.: US 12,289,051 B2
(45) Date of Patent: Apr. 29, 2025

(54) SWITCHING REGULATOR AND POWER MANAGEMENT INTEGRATED CIRCUIT

(71) Applicant: SAMSUNG ELECTRONICS CO., LTD., Suwon-si (KR)

(72) Inventors: Jaekwan Kim, Seoul (KR); Gwangyol Noh, Yongin-si (KR); Hwayeal Yu, Bucheon-si (KR); Gil Won Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 264 days.

(21) Appl. No.: 17/706,237

(22) Filed: Mar. 28, 2022

(65) Prior Publication Data

US 2023/0118761 A1 Apr. 20, 2023

(30) Foreign Application Priority Data

Oct. 19, 2021 (KR) .......................... 10-2021-0139386

(51) Int. Cl.
  *H02M 3/158* (2006.01)
  *H02M 1/00* (2006.01)
  *H02M 1/08* (2006.01)
  *H02M 1/38* (2007.01)

(52) U.S. Cl.
  CPC ......... *H02M 3/158* (2013.01); *H02M 1/0009* (2021.05); *H02M 1/0051* (2021.05); *H02M 1/0058* (2021.05); *H02M 1/08* (2013.01); *H02M 1/38* (2013.01)

(58) Field of Classification Search
  CPC .. H02M 1/0051; H02M 1/0058; H02M 3/158; H02M 1/08; H02M 1/38
  See application file for complete search history.

(56) References Cited

U.S. PATENT DOCUMENTS

| | | | |
|---|---|---|---|
| 9,444,324 B2 | 9/2016 | Lee | |
| 9,543,829 B2 | 1/2017 | Choi et al. | |
| 9,847,721 B2 | 12/2017 | Kim | |
| 9,917,504 B2 | 3/2018 | Lin et al. | |
| 9,985,530 B2 | 5/2018 | Sasaki et al. | |
| 10,491,105 B1 | 11/2019 | Cho et al. | |
| 10,784,775 B1* | 9/2020 | Chang | H02M 1/08 |
| 2007/0085520 A1* | 4/2007 | Ho | H02M 3/1588 323/282 |
| 2013/0335048 A1* | 12/2013 | Herzog | H03K 17/063 323/283 |

(Continued)

*Primary Examiner* — Harry R Behm
(74) *Attorney, Agent, or Firm* — Fish & Richardson P.C.

(57) ABSTRACT

A switching regulator may include; an inductor connected to a switch node, a power switch connected to the switch node and configured to apply a first voltage to the switch node in response to a first control signal and to apply a second voltage to the switch node in response to a second control signal, and a controller configured to generate the first control signal and the second control signal. The second control signal transitions from low to high following a first dead time after the first control signal transitions from low to high, the first control signal transitions from high to low following a second dead time after the second control signal transitions from high to low level, and an inductor current flowing through the inductor flows in a first direction during the first dead time and in a second direction, different from the first direction, during the second dead time.

17 Claims, 9 Drawing Sheets

(56) References Cited

U.S. PATENT DOCUMENTS

| | | | |
|---|---|---|---|
| 2014/0002049 A1* | 1/2014 | Schrom | H02M 3/1588 |
| | | | 323/311 |
| 2014/0191744 A1* | 7/2014 | Choi | H02M 3/158 |
| | | | 323/283 |
| 2016/0308441 A1* | 10/2016 | Chen | H02M 3/1588 |
| 2019/0044442 A1* | 2/2019 | Schaef | H02M 3/1588 |
| 2021/0126522 A1 | 4/2021 | Preindl et al. | |
| 2021/0384825 A1* | 12/2021 | Karadi | H02M 3/157 |

\* cited by examiner

SWITCHING REGULATOR AND POWER MANAGEMENT INTEGRATED CIRCUIT

CROSS-REFERENCE TO RELATED APPLICATIONS

This application claims priority under 35 U.S.C. § 119 to Korean Patent Application No. 10-2021-0139386 filed on Oct. 19, 2021 in the Korean Intellectual Property Office, the subject matter of which is hereby incorporated by reference in its entirety.

BACKGROUND

Embodiments of the inventive concept relate generally to switching regulators converting an input voltage to an output voltage. Embodiments of the inventive concept also relate to power management integrated circuits (PMICs) including switching regulators.

A PMIC may be used to generate one or more supply voltage(s) routinely provided to electronic systems, circuits, components, and/or elements (hereafter generally, "electronic devices), wherein the respective level(s) of the supply voltage(s) are determined in relation to performance requirement(s) for the electronic devices. The PMIC may include one or more regulator(s) used in the generation (or definition) of supply voltage levels.

In this regard, a regulator may be a circuit that converts an externally provided, input power signal into an internal, direct current (DC) power signal compatible with an intended electronic device (e.g., a system including power switches). Assuming that the input power signal is a DC power signal, the regulator may operate, for example, as a DC-DC converter stepping up or stepping down a level of the input DC power signal. Here, the DC-DC converter may include a boost converter (e.g., one type of step-up converter) capable of increasing the level of the input DC power signal, a buck converter (e.g., one type of step-down converter) capable of decreasing the level of the DC input power signal, and/or a buck-boost converter capable of either increasing or decreasing the level of the input DC power signal.

SUMMARY

Embodiments of the inventive concept provide switching regulators capable of performing soft switching. Embodiments of the inventive concept also provide power management integrated circuits (PMICs) including switching regulators capable of performing soft switching.

According to an embodiment, a switching regulator may include; an inductor connected to a switch node, a power switch connected to the switch node and configured to apply a first voltage to the switch node in response to a first control signal and to apply a second voltage to the switch node in response to a second control signal, and a controller configured to generate the first control signal and the second control signal, wherein the second control signal transitions from low to high following a first dead time after the first control signal transitions from low to high, the first control signal transitions from high to low following a second dead time after the second control signal transitions from high to low level, and an inductor current flowing through the inductor flows in a first direction during the first dead time and in a second direction, different from the first direction, during the second dead time.

According to an embodiment, a switching regulator used to convert an input power voltage into an output power voltage may include; an inductor connected to a switch node, a power switch including a first transistor applying the input power voltage to the switch node in response to a first control signal and a second transistor applying a ground voltage to the switch node in response to a second control signal, a peak current sensor configured to provide a peak current sensing signal when an inductor current flowing through the inductor reaches a peak current, a zero current detector configured to provide a zero current sensing signal when the inductor current is an offset current, a feedback controller configured to compare the output power voltage and a target voltage and provide a corresponding feedback signal, a pulse frequency modulation generator configured to provide a pulse frequency modulation signal based on the peak current sensing signal, the zero current sensing signal, the feedback signal, and a reference voltage, and a gate driver configured to provide the first control signal and the second control signal based on the pulse frequency modulation signal, wherein the first transistor and the second transistor are turned OFF during a first dead time after the inductor current reaches the peak current, the first transistor and the second transistor are turned OFF during a second dead time after the inductor current reaches the offset current, and a direction of the peak current and a direction of the offset current are opposite to each other.

According to an embodiment, a power management integrated circuit may include a switching regulator configured to convert an input power voltage into an output power voltage. Here, the switching regulator may include; an inductor connected to a switch node, a power switch connected to the switch node and configured to apply a first voltage to the switch node in response to a first control signal and to apply a second voltage to the switch node in response to a second control signal, and a controller configured to generate the first control signal and the second control signal. The second control signal may transition from low to high following a first dead time after the first control signal transitions from low to high, the first control signal may transition from high to low following a second dead time after the second control signal transitions from high to low, and an inductor current flowing through the inductor may flow in a first direction during the first dead time and in a second direction, different from the first direction, during the second dead time.

BRIEF DESCRIPTION OF THE DRAWINGS

Various advantages, benefits, feature and related aspects of the inventive concept may be understood upon consideration of the following detail description together with the accompanying drawings, in which.

DETAILED DESCRIPTION

Throughout the written description and drawings, like reference numbers and labels are used to denote like or similar systems, components, circuits, elements, features and/or method steps.

Figure 1:
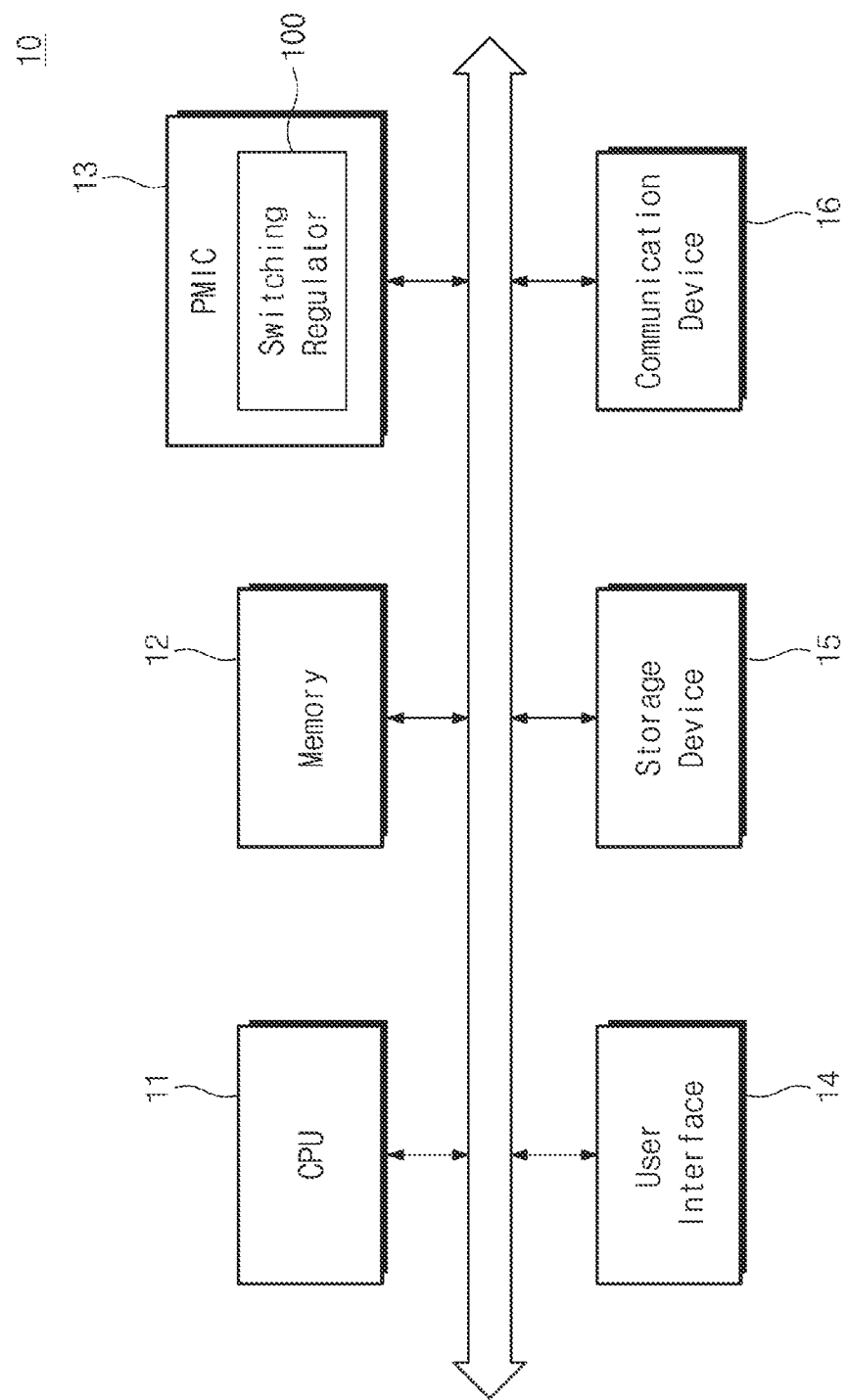
FIG. 1 is a block diagram illustrating electronic device according to embodiments of the inventive concept.

FIG. 1 is a block diagram illustrating an electronic device 10 according to embodiments of the inventive concept. Referring to FIG. 1, the electronic device 10 may generally include a central processing unit (CPU) 11, a memory 12, a power management integrated circuit (PMIC) 13, a user interface 14, a storage device 15, and a communication device 16.

In some embodiments, the electronic device 10 may include various semiconductor chip(s), semiconductor device(s), semiconductor package(s), semiconductor module(s), semiconductor system(s), and/or system-on-chip (SoC) devices. As selected examples, the electronic device 10 be a smartphone, a tablet personal computer (PC), a mobile phone, a video telephone, an e-book reader, a desktop personal computer (PC), a laptop personal computer (PC), a netbook computer, a workstation, a server, a personal digital assistant (PDA), a portable multimedia player (PMP), an MP3 player, mobile medical devices, a digital TV, a camera, a wearable device, an Internet of Things (IoT) device, an Internet of Everything (IoE) device, a virtual reality (VR) device, an augmented reality (AR) device, a data center, or an LED driving device.

The CPU 11 may perform various computations/calculations necessary to the operation of the electronic device 10. For example, the CPU 11 may execute software, firmware, instruction sequences, and/or programming code (e.g., an operating system and/or application(s) running on the operating system) loaded into the memory 12. Further, the CPU 11 may store results of such calculations/computations in the memory 12.

Accordingly, the memory 12 may be used to store data and programming code associated with the operation of the CPU 11. In some embodiments, the memory 12 may operate as a main memory device for the electronic device 10. Alternately or additionally, the memory 12 may operate as a buffer memory, a cache memory, and/or a working memory.

The memory 12 may include one or more volatile memories (e.g., a static random access memory (RAM) (SRAM) or a dynamic RAM (DRAM)) and/or one or more nonvolatile memories (e.g., a flash memory, a phase-change RAM (PRAM), a magneto-resistive RAM (MRAM), a resistive RAM (ReRAM), and a ferro-electric RAM (FRAM)). The memory 12 may be physically implemented as two or more memories or memory systems. The memory 12 may be implemented as an external memory device(s) capable of communicating with the electronic device 10 and/or one or more internal memories.

The PMIC 13 may be used to generate one or more power voltage(s) and/or current(s) (hereafter, singularly or collectively, "power voltage/current") necessary to the operation of the electronic device 10. Such power voltage/current may be variously provided to components (e.g., CPU 11, memory 12, user interface 14, storage device 15, and/or communication device 16) of the electronic device 10. Thus, each of the components of the electronic device 10 may be understood as performing one or more function(s) in response to the power voltage/current, as provided by the PMIC 13. In some embodiments, the PMIC 13 may be implemented as a circuit external to the electronic device 10.

The PMIC 13 may include various circuits capable of defining and generating the power voltage/current. For example, the PMIC 13 ma include one or more reference voltage generator(s), one or more regulator(s) (e.g., linear regulator(s) and/or switching regulator(s)), and one or more converter(s) (e.g., boost converter(s), buck converter(s), and/or boost-buck converter(s).

In the illustrated example of FIG. 1, the PMIC 13 is assumed to include a switching regulator 100.

In this regard, the switching regulator 100 may provide (or output) an output power signal (e.g., an output power voltage VOUT) by regulating (or converting) an input power signal (e.g., an input power voltage VIN). Hence, it is assumed that the switching regulator 100 functions as a DC-DC converter. In some embodiments, the switching regulator 100 may be understood as a switching mode power supply (SMPS) or a circuit included in a SMPS. The switching regulator 100 may perform power conversion using at least one of, for example, a power switch, an inductor, and a capacitor.

In some embodiments, the switching regulator 100 may selectively operate in either a heavy load operating mode or a light load operating mode, as determined and controlled by the CPU 11. For example, when an operating load (e.g., a number of a type of operations) for any one of the components of the electronic device 10 increases (e.g., when the CPU 11 performs one or more operations, a computational load placed upon the CPU 11 increases, and/or data is written to or read from the memory 12 and/or the storage device 15), the CPU 11 may determine that the switching regulator 100 will operate in the heavy load operating mode. In the heavy load operating mode, the switching regulator 100 may output a corresponding output power voltage defined using (e.g.,) a pulse width modulation mode. Alternately, when the electronic device 10 enters a standby mode or when the CPU 11 enters an idle state, the CPU 11 may determine that the switching regulator 100 will operate in the light load operating mode. In the light load operating mode, the switching regulator 100 may output a corresponding output power voltage defined using (e.g.,) a pulse frequency modulation mode, a burst mode, or an ON/OFF mode.

In some embodiments, the switching regulator 100 may include an inductor L connected to a switch node, wherein an output of a power switch is connected to the switch node. Here, the power switch may apply either a first voltage to the switch node in response to a first control signal, or a second voltage to the switch node in response to a second control signal, wherein the controller may be used to generate the first control signal and the second control signal. The second control signal may transition from a low level (hereafter, "low") to a high level (hereafter "high") following a first dead time. (Here, the term "dead time" may refer to a period of time between turning OFF of one transistor and turning ON of another transistor—e.g., a time during which the first control signal transitions from high to low). Likewise, the first control signal may transition from high to low following a second dead time (e.g., a time during which the second control signal transitions from high to low). As a result, a current flowing through the inductor L in one direction during the first dead time (i.e., a first direction) may reverse and flow through the inductor L in another direction (i.e., a second direction) during the second dead time.

The user interface 14 may be used to communicate with a user of the electronic device 10 under control of the CPU 11. For example, the user interface 14 may provide the user with data stored in the memory 12 or the storage device 15. In this regard, the user interface 14 may receive data or a request for data processing from the user. In some embodiments, the user interface 14 may include at least one of, for example, a microphone, a keyboard, a mouse, a touch screen, a display device (e.g., a monitor) and a speaker.

The storage device 15 may be provided as a storage medium in relation to the electronic device 10. The storage device 15 may store data generated by the CPU 11 (e.g., data requiring longer term storage), files to be operated upon by the CPU 11, as well as various software, firmware, programming code, and executable instructions. The storage device 15 may function as an auxiliary memory device in relation to the electronic device 10. In some embodiments, the storage device 15 may be variously implemented as a memory card (e.g., a MMC, an eMMC, a SD, a microSD, etc.). Alternately or additionally, the storage device 15 may include a nonvolatile memory such as a NAND flash memory, a NOR flash memory, a PRAM, an MRAM, a ReRAM, or a FRAM. In some embodiments, the electronic device 10 may include two or more storage devices 15. In some embodiments, the storage device 15 may be external to the electronic device 10.

The communication device 16 may be used to communicate with various device(s) external to the electronic device 10 using one or more wired and/or wireless communication protocol(s). For example, under control of the CPU 11, the communication device 16 may receive data from an external device and/or transmit data retrieved from the memory 12 or the storage device 15 to the external device.

Figure 2:
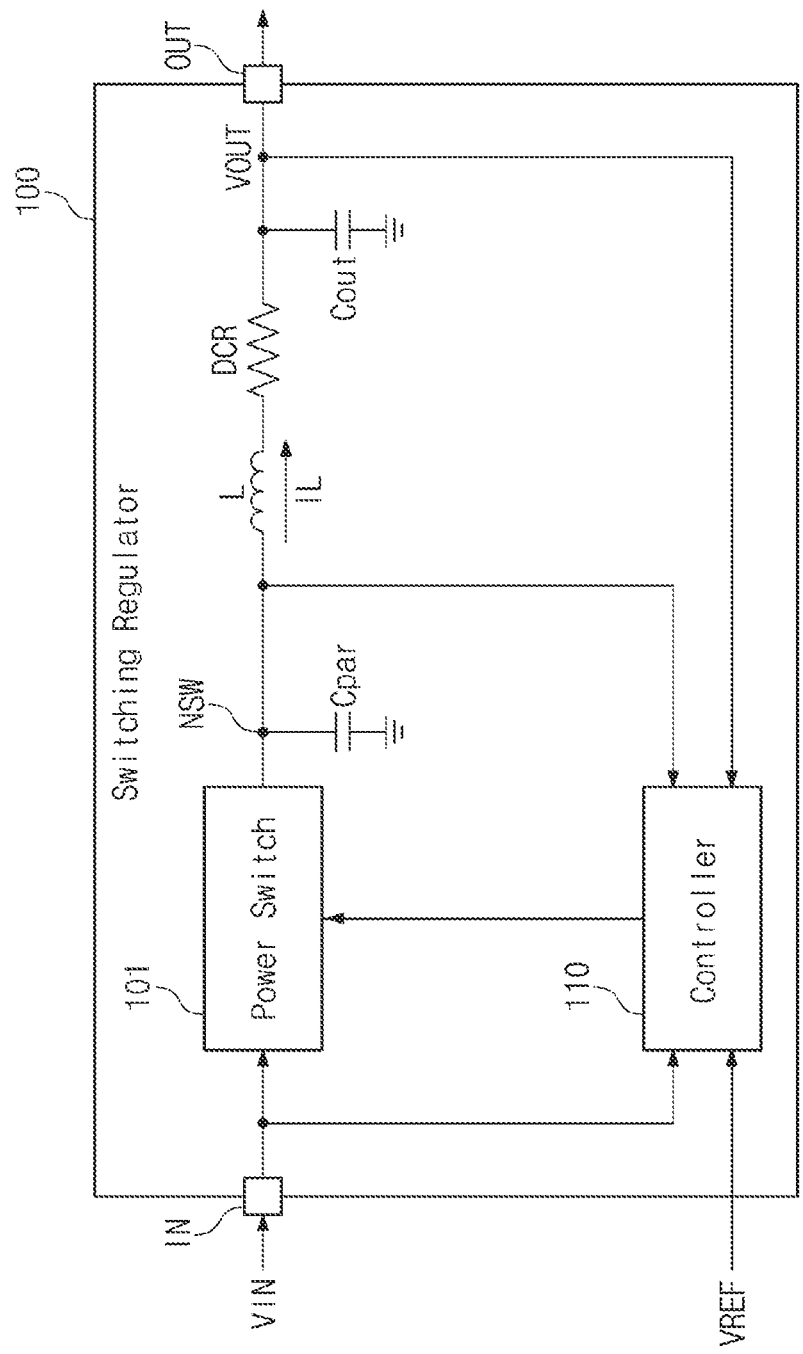
FIG. 2 is a block diagram further illustrating in one example (100) the switching regulator of FIG. 1.

FIG. 2 is a block diagram further illustrating in one example the switching regulator 100 of FIG. 1. Referring to FIGS. 1 and 2, the switching regulator 100 may include a power switch 101, a controller 110 controlling the power switch 101, an inductor L, a resistor DCR, and an output capacitor Cout. For purposes of clarity, a parasitic capacitor Cpar and a switch node NSW are also indicated in FIG. 2. An input power voltage VIN may be applied (or provided) to an input terminal IN of the switching regulator 100, and an output power voltage VOUT may be provided (apparent) at an output terminal OUT of the switching regulator 100.

Hereafter, it is assumed that the switching regulator 100 operates in a pulse frequency modulation (PFM) mode. However, the switching regulator 100 may operate in one or more additional modes, such as a pulse width modulation (PWM) mode. It is further assumed that the switching regulator 100 includes various DC-DC converters, such as a boost converter, a buck converter and/or a buck-boost converter.

The power switch 101 may be switched (e.g., turned ON or turned OFF) under the control of the controller 110. As the power switch 101 is switched, a voltage apparent at the switch node NSW may be pulled up or pulled down in response to the input power voltage VIN. As such, a magnitude of an inductor current IL flowing through the inductor L from the switch node NSW may be regulated.

The parasitic capacitor Cpar may be understood as being connected between the switch node NSW and ground. The parasitic capacitor Cpar may be further understood as a modeled (or mathematically derived) capacitance associated with the switch node NSW, the power switch 101 and/or elements and features related to the switch node NSW and power switch 101. Thus, as a voltage apparent at the switch node NSW is pulled up, electrical charge may be stored in the parasitic capacitor Cpar.

As the voltage of the switch node NSW is pulled up, the inductor current IL flowing to the inductor L may increase. The inductor current IL may supply electrical charge to the output capacitor Cout through the resistor DCR. The resistor DCR may be understood as a modeled DC resistance associated with the inductor L.

The level of the output power voltage VOUT may vary in relation to an amount of electrical charge stored by the output capacitor Cout.

Here, the output power voltage VOUT may be fed back to the controller 110 along with the input power voltage VIN, a reference voltage VREF, and the voltage apparent at the switch node NSW. In response, the controller 110 may generate control signals that control the switching of the power switch 101. For example, the controller 110 may detect (or monitor) the inductor current IL, compare the output power voltage VOUT and the reference voltage VREF, and generate the switching control signals for the power switch 101 in relation to the input power voltage VIN. Thus, the power switch 101 may be switched in response to the switch control signals generated by the controller 110 in order to regulate the level of the output power voltage VOUT.

In some embodiments, the switching regulator 100 may be a synchronous switching regulator, but the scope of the inventive concept is not limited thereto.

Figure 3:
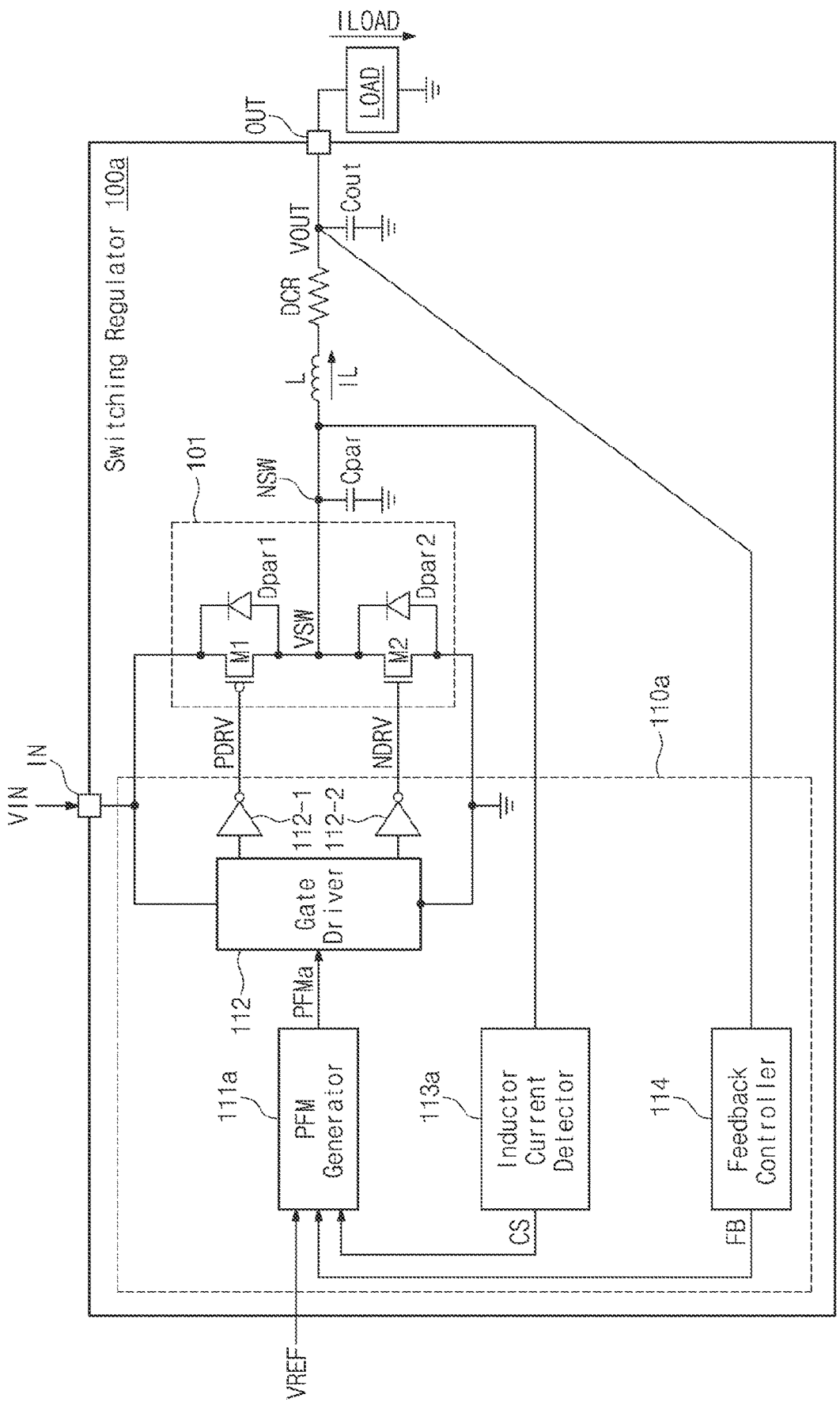
FIG. 3 is a block diagram further illustrating in another example (100a) the switching regulator of FIG. 1.

FIG. 3 is a block diagram further illustrating in another example (100a) the switching regulator 100 of FIG. 1. Referring to FIGS. 1, 2 and 3, the switching regulator 100 of FIG. 2 may be alternately implemented as the switching regulator 100a of FIG. 3.

The switching regulator 100a of FIG. 3 may include a controller 110a, the power switch 101, the inductor L, and the output capacitor Cout. A load device LOAD may be connected to the output terminal OUT of the switching regulator 100a.

The controller 110a may include a PFM generator 111a, a gate driver 112, inverters 112-1 and 112-2, an inductor current detector 113a, and a feedback controller 114. The PFM generator 111a may generate a signal PFMa controlling the gate driver 112 in response to the reference voltage VREF, a current sensing signal CS, and a feedback signal FB. In some embodiments, the PFM generator 111a may include a comparator that compares the reference voltage VREF and the feedback signal FB. The PFM generator 111a may receive the current sensing signal CS from the inductor current detector 113a. The PFM generator 111a may receive the feedback signal FB from the feedback controller 114. The PFM generator 111a may generate the signal PFMa using a PFM technique in response to the current sensing signal CS, the feedback signal FB, and the comparison between the reference voltage VREF and the feedback signal FB. The PFM generator 111a may apply the generated signal PFMa to the gate driver 112.

In some embodiments, the number of pulses in the signal PFMa per unit time (e.g., a frequency of the signal PFMa) may be adjusted by the PFM generator 111a. For example, in order to increase a load current ILOAD, the PFM generator 111a may increase the frequency of the signal PFMa. Thus, the power switch 101 may be turned ON/OFF more rapidly (or more frequently during the unit time, thereby increasing the PFMa signal frequency). As such, the output power voltage VOUT may increase, and the magnitude of the load current ILOAD may also increase.

The gate driver 112 may generate control signals that switch the power switch 101 in response to the signal PFMa output by the PFM generator 111a. The gate driver 112 may generate the control signals in response to the signal PFMa output from the PFM generator 111a. For example, based on the signal PFMa, the gate driver 112 may generate a first control signal applied to a gate of a transistor M1 through the inverter 112-1, and a second control signal applied to a gate of a transistor M2 through the inverter 112-2. A period of time during which the first control signal is high, a period of time during which the second control signal is high, as well as a dead time for the power switch 101 may be controlled by the gate driver 112 in response to the signal PFMa. In some embodiments, the gate driver 112 may further include a controller (e.g., a microcontroller) that controls the period of the dead time for the power switch 101.

The gate driver 112 may respectively apply the control signals to the gates of the transistors M1 and M2 of the power switch 101 through the inverters 112-1 and 112-2. Thus, the control signals generated by the gate driver 112 may be inverted by the inverters 112-1 and 112-2, and thereafter respectively provided to the gates of the transistors M1 and M2 as control signals, PDRV and NDRV.

The inductor current detector 113a may detect a magnitude of the inductor current IL. The inductor current detector 113a may compare the magnitude of the inductor current IL with a magnitude of a peak current (e.g., a peak current Ipeak of FIG. 4). Alternately, the inductor current detector 113a may compare the magnitude of the inductor current IL with a magnitude of a minimum current. The magnitude of the peak current and the magnitude of the minimum current may be determined in advance. If the magnitude of the inductor current IL is greater than or equal to the magnitude of the peak current, or if the magnitude of the inductor current IL is less than or equal to the magnitude of the minimum current, the inductor current detector 113a may output the current sensing signal CS to the PFM generator 111a. For example, if the magnitude of the inductor current IL is greater than or equal to the magnitude of the peak current, the current sensing signal CS may have a first level indicating this first relationship. Whereas, if the magnitude of the inductor current IL is less than or equal to the magnitude of the minimum current, the current sensing signal CS may have a second level, different from the first level, indicating this second relationship.

The feedback controller 114 may sense the output power voltage VOUT. That is, the feedback controller 114 may output the feedback signal FB in accordance a determination that the output power voltage VOUT is greater than or less than a target voltage. For example, if the output power voltage VOUT is less than the target voltage, the feedback controller 114 may output to the PFM generator 111a the feedback signal FB indicating an increase in the level of the output power voltage VOUT. If, however, the output power voltage VOUT is greater than the target voltage, the feedback controller 114 may output to the PFM generator 111a the feedback signal FB indicating a decrease in the level of the output power voltage VOUT.

The power switch 101 may include the transistors M1 and M2. Here, the transistor M1 may be implemented as a P-channel Metal-Oxide-Semiconductor (PMOS) transistor, and the transistor M2 may be implemented as an N-channel Metal Oxide Semiconductor (NMOS) transistor. Parasitic diodes Dpar1 and Dpar2 may be elements respectively corresponding to modeling of the parasitic diodes (e.g., body diodes) of the transistors M1 and M2.

The transistor M1 may include a first terminal (e.g., a source) receiving the input power voltage VIN, a gate receiving the control signal PDRV, and a second terminal (e.g., a drain) connected to the switch node NSW. The parasitic diode Dpar1 may be connected between the first terminal and the second terminal of the transistor M1. The transistor M2 may include a first terminal (e.g., a drain) connected to the switch node NSW, a gate receiving the control signal NDRV, and a second terminal (e.g., a source) receiving a ground voltage applied. The parasitic diode Dpar2 may be connected between the first terminal and the second terminal of the transistor M2.

The transistor M1 may be turned ON in response to a low control signal PDRV. In this case, the input power voltage VIN may be transferred to the switch node NSW through the transistor M1, and thus, a switch voltage VSW may increase. The transistor M1 may be turned OFF in response to a high control signal PDRV.

The transistor M2 may be turned ON in response to a high control signal NDRV. In this case, the switch voltage VSW of the switch node NSW may decrease towards the ground voltage. The transistor M2 may be turned OFF in response to a low control signal NDRV. And in this case, the switch node NSW may be electrically disconnected from the second terminal of the transistor M2 that receives the ground voltage.

The load device LOAD may be connected to the output terminal OUT of the switching regulator 100a, such that the load current ILOAD flows through the load device LOAD from the output terminal OUT of the switching regulator 100a in response to the level of the output power voltage VOUT. However, as the load current ILOAD flows, the magnitude of the output power voltage VOUT may decrease over time, and the switching regulator 100a may sense the decrease in the output power voltage VOUT and adjust the output power voltage VOUT to the target voltage. Here, the target voltage may defined according to the particular operating characteristics and requirements of the load device LOAD.

Figure 4:
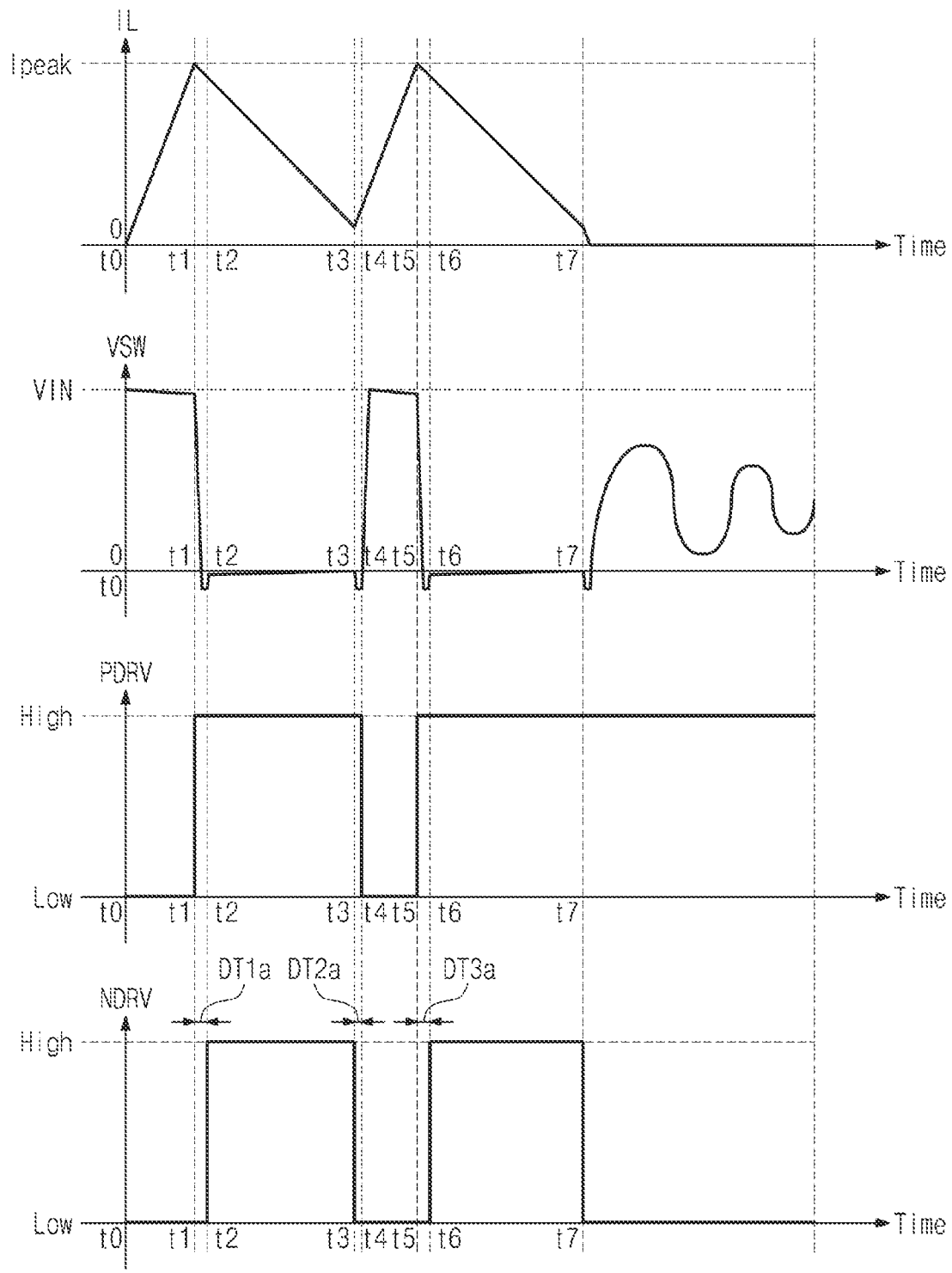
FIG. 4 is a timing diagram illustrating operation of the switching regulator 100a of FIG. 3.

FIG. 4 is a timing diagram illustrating operation of the switching regulator 100a of FIG. 3. Variations in the inductor current IL, the switch voltage VSW, the control signal PDRV, and the control signal NDRV depend on the operation of the switching regulator 100a.

The various signal waveforms of FIG. 4 assume the use of a switching regulator like the ones described in relation to FIGS. 1, 2 and 3. Here, for purposes of this illustration, the pulse waveform of the inductor current IL is assumed include two triangular pulses.

At time t0, the magnitude of the inductor current IL is assumed to be about 0. As the transistor M1 is turned ON in response to a low control signal PDRV level, the magnitude of the switch voltage VSW may be substantially the same as the magnitude of the input power voltage VIN. That is, the magnitude of the switch voltage VSW may approximate the magnitude of the input power voltage VIN. (Here, it is further assumed that the parasitic capacitor Cpar has been sufficiently charged by the input power voltage VIN before time t0). After time t0, the inductor current IL flowing through the inductor L may increase in response to the switch voltage VSW.

At time t1, the magnitude of the inductor current IL may be the same as the peak current Ipeak. The inductor current detector 113a may detect the magnitude of the inductor current IL and may output the current sensing signal CS to the PFM generator 111*a* indicating that the magnitude of the inductor current IL is the same as (or approximates) the peak current Ipeak. The PFM generator 111*a* may generate the signal PFMa for turning OFF the power switch 101 and may apply the generated signal PFMa to the gate driver 112. The control signal PDRV provided by the gate driver 112 to the gate of the transistor M1 may transition from low to high in response to the signal PFMa.

The transistor M1 may be turned OFF in response to a high control signal PDRV. After time t1, the inductor current IL and the switch voltage VSW may decrease in response to y power consumption by the load device LOAD connected to the output terminal OUT of the switching regulator 100*a*. That is, power consumption by the load device LOAD may decrease the switch voltage VSW to a level less than the ground voltage. For example, as power is consumed by the load device LOAD, electrical charge associated with the parasitic capacitor Cpar may be discharged. Then, the parasitic diode Dpar2 of the transistor M2 may be turned ON due to a positive inductor current IL (i.e., a current flowing from the switch node NSW to the output terminal OUT through the inductor L and the resistor DCR). As such, the switch voltage VSW may fall below the ground voltage by as much as the threshold voltage of the parasitic diode Dpar2 associated with the transistor M2.

At time t2, the control signal NDRV provided by the gate driver 112 to the gate of the transistor M2 may transition from low to high. For example, the gate driver 112 may operate such that a high control signal NDRV is applied to the gate of the transistor M2 after a first dead time DT1*a* following time t1. The transistor M2 may be turned ON in response to a high control signal NDRV, and the ground voltage may be applied to the switch node NSW through the transistor M2. As such, the switch voltage VSW may increase to the ground voltage, and the inductor current IL may decrease. Here, the speed with which the inductor current IL decreases may be proportional to the magnitude of the output power voltage VOUT.

At time t3, the control signal NDRV may transition from high to low. And the inductor current detector 113*a* may detect the magnitude of the inductor current IL and output the current sensing signal CS to the PFM generator 111*a* once the magnitude of the inductor current IL become about the same (e.g., approximates) as the minimum current. The PFM generator 111*a* may generate the signal PFMa for turning OFF the power switch 101 and may apply the generated signal PFMa to the gate driver 112. The control signal NDRV provided by the gate driver 112 to the gate of the transistor M2 may transition from high to low in response to the signal PFMa.

The transistor M2 may be turned OFF in response to a low control signal NDRV, and the parasitic diode Dpar2 of the transistor M2 may be turned ON due to the positive inductor current IL. As such, the magnitude of the switch voltage VSW may decrease lowers the ground voltage. For example, the switch voltage VSW falls below the ground voltage by as much as a threshold voltage of the parasitic diode Dpar2 associated with the transistor M2.

At time t4, the control signal PDRV provided by the gate driver 112 to the gate of the transistor M1 may transition from high to low. For example, the gate driver 112 may operate such that a low control signal PDRV is applied to the gate of the transistor M1 after a second dead time DT2*a* following time t3. The transistor M1 may be turned ON in response to a low control signal PDRV, and the input power voltage VIN may be applied to the switch node NSW through the transistor M1. As such, the switch voltage VSW may increase to the input power voltage VIN, and the inductor current IL may also increase.

At time t5, the magnitude of the inductor current IL may be about the same (e.g., approximates) the peak current Ipeak. And as described in relation to the time t1, the control signal PDRV provided by the gate driver 112 to the gate of the transistor M1 may transition from low to high, and the transistor M1 may be turned OFF in response to a high control signal PDRV. Afterwards, the inductor current IL and the switch voltage VSW may decrease in response to power consumption by the load device LOAD connected to the output terminal OUT of the switching regulator 100*a*. As a power is consumed by the load device LOAD, the parasitic capacitor Cpar may be discharged, the parasitic diode Dpar2 may be turned ON, and the switch voltage VSW may fall below the ground voltage. For example, the switch voltage VSW fall below the ground voltage by as much as a threshold voltage of the parasitic diode Dpar2 associated with the transistor M2.

At time t6, the control signal NDRV provided by the gate driver 112 to the gate of the transistor M2 may transition from low to high. For example, the gate driver 112 may operate such that a high control signal NDRV is applied to the gate of the transistor M2 after a third dead time DT3*a* following time t5. The transistor M2 may be turned ON in response to a high control signal NDRV, and the ground voltage may be applied to the switch node NSW through the transistor M2. As such, the switch voltage VSW may increase to the ground voltage, and the inductor current IL may also decrease.

At time t7, the control signal NDRV provided by the gate driver 112 to the gate of the transistor M2 may transition from high to low. For example, in response to the feedback signal FB, the PFM generator 111*a* may determine that the output power voltage VOUT of the switching regulator 100*a* is the same as (or approximates) the target voltage. The power switch 101 may be controlled by the gate driver 112 according to the determination result and not remain switched any longer. That is, the transistors M1 and M2 may remain turned-OFF. As such, the inductor current IL may decrease to a value of 0, and the switch voltage VSW may also decrease or converge. One example in which the switch voltage VSW transiently converges is illustrated in FIG. 4, but depending on power consumption of the load device LOAD, the switch voltage VSW may otherwise transiently decrease (e.g., gradually decrease). Afterwards, the power switch 101 may be again switched when the output power voltage VOUT falls below the target voltage.

Thus, the transistors M1 and M2 may be turned OFF during the first dead time DT1*a* (e.g., a time period from t1 to t2), the second dead time DT2*a* (e.g., a time period from t3 to t4), and the third dead time DT3*a* (e.g., a time period from t5 to t6). And as such, the transistors M1 and M2 may not be turned ON at the same time. As a result, the first terminal of the transistor M1 to receiving the input power voltage VIN and the second terminal of the transistor M2 receiving the ground voltage will not be electrically connected—a condition that might potentially cause damage the power switch 101.

Here, it should be noted that at discrete moments along the time period illustrated in FIG. 4 (e.g., from time t0 to time t7), the switching operation of the switching regulator 100*a* may result in power loss. For example, as the result of the switching operations by the switching regulator 100*a*, the transistor M1 and the transistor M2 of the power switch 101 will be variously turned ON/OFF. Whenever the transistors M1 and M2 of the power switch 101 are alternately turned ON/OFF, power loss may occur due to the presence of the parasitic capacitor Cpar associated with the switch node NSW and the presence of the parasitic diode Dpar2 associated with the transistor M2.

For example, as described above, before any transistor is turned ON, both of the transistors M1 and M2 of the power switch 101 may be turned OFF during the first dead time DT1a, the second dead time DT2a, and/or the third dead time DT3a. While both of the transistors M1 and M2 are turned OFF, due to the positive inductor current IL, the parasitic capacitor Cpar of the switch node NSW may be discharged, and the parasitic diode Dpar2 may be turned ON. Accordingly, the power loss may occur due to the conduction of the parasitic diode Dpar2.

Further, as another example, when the transistor M1 is again turned ON, the discharged parasitic capacitor Cpar may be again charged by the input power voltage VIN. A loss current that is supplied to the parasitic capacitor Cpar based on the input power voltage VIN may be inversely proportional to a period of time taken for the switch voltage VSW of the switch node NSW to be the input power voltage VIN.

As the periods of the first dead time DT1a, the second dead time DT2a, and the third dead time DT3a increase and as a switching frequency of the power switch 101 increases, power loss due to conduction of the parasitic diode Dpar2 and the power loss due to the recharging of the parasitic capacitor Cpar may increase.

Figure 5:
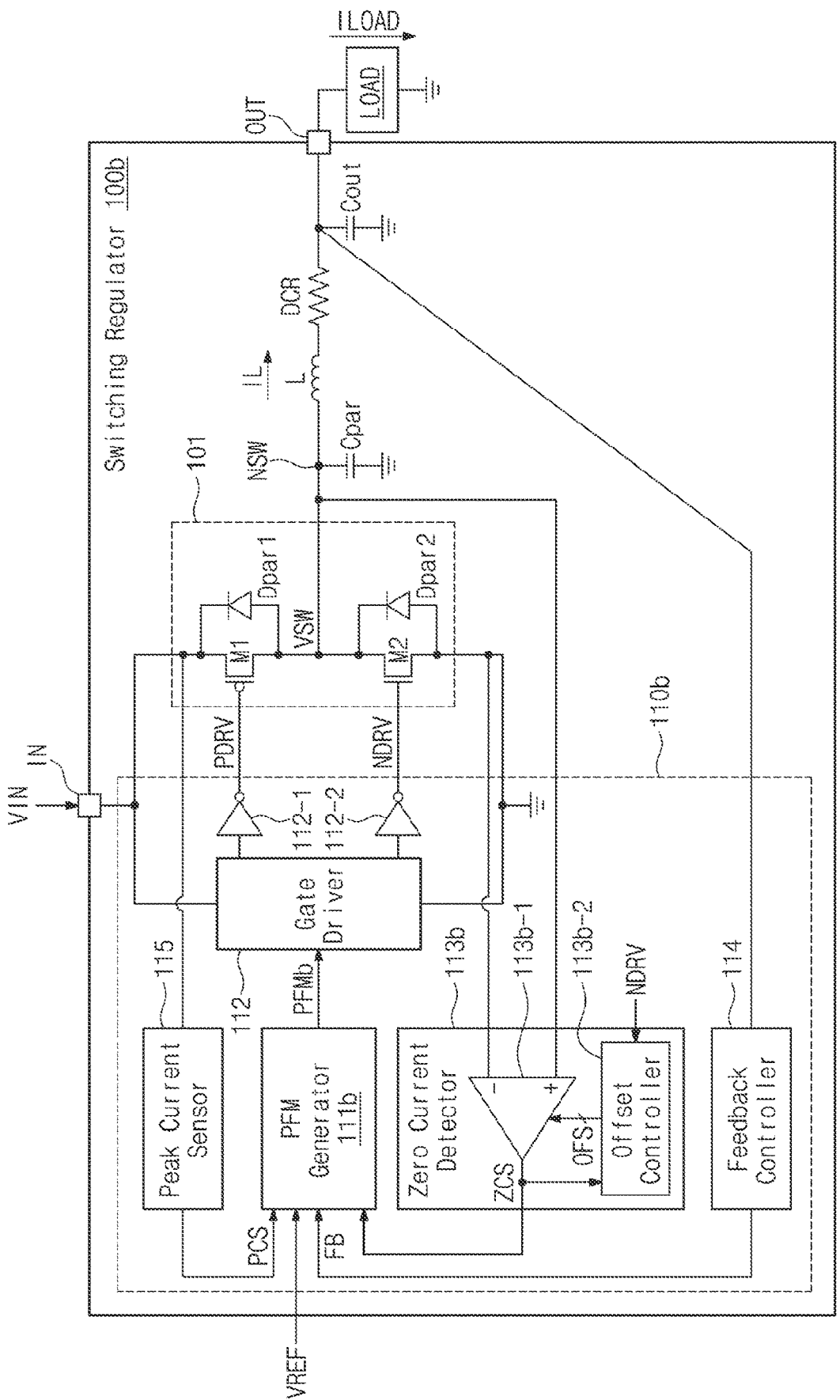
FIG. 5 is a block diagram further illustrating in still another example (100b) the switching regulator of FIG. 1.

FIG. 5 is a block diagram further illustrating in still another example (100b) the switching regulator 100 of FIG. 2. Referring to FIGS. 1, 2 and 5, the switching regulator 100 of FIG. 2 may be alternately implemented as the switching regulator 100b of FIG. 5.

As in the switching regulator 100a of FIG. 3, the switching regulator 100b of FIG. 5 may include the power switch 101, the parasitic capacitor Cpar, the inductor L, the resistor DCR, and the output capacitor Cout, and the load device LOAD may be connected to the output terminal OUT of the switching regulator 100b. Unlike the switching regulator 100a of FIG. 3, the switching regulator 100b of FIG. 5 may include a controller 110b instead of the controller 110a. Hereafter, material differences between the switching regulator 100a of FIG. 3 and the switching regulator 100b of FIG. 5 will be described in some additional detail.

The controller 110b of FIG. 5 may include a PFM generator 111b, the gate driver 112, a zero current detector 113b, the feedback controller 114, and a peak current sensor 115. Unlike the PFM generator 111a of FIG. 3, the PFM generator 111b of FIG. 5 may generate a signal PFMb controlling the gate driver 112 in response to a peak current sensing signal PCS, a zero current sensing signal ZCS, the feedback signal FB, and the reference voltage VREF.

For example, the PFM generator 111b may receive the zero current sensing signal ZCS from the zero current detector 113b. The PFM generator 111b may receive the feedback signal FB from the feedback controller 114. The PFM generator 111b may receive the peak current sensing signal PCS from the peak current sensor 115. The PFM generator 111b may compare the feedback signal FB and the reference voltage VREF. The PFM generator 111b may determine whether to increase a switching frequency of the power switch 101 based on a comparison result. The PFM generator 111b may output the PFM signal PFMb to the gate driver 112 based on the zero current sensing signal ZCS, the feedback signal FB, the peak current sensing signal PCS, and the comparison result. The switching (or switching frequency) of the power switch 101 may be controlled through the gate driver 112 depending on the PFM signal PFMb.

The gate driver 112 may generate a first control signal and a second control signal that control switching of the power switch 101 in response to the signal PFMb output from the PFM generator 111b. The first and second control signals generated from the gate driver 112 may be respectively provided to the gates of the transistors M1 and M2 through the inverters 112-1 and 112-2 as control signals, PRDV and NDRV.

The zero current detector 113b may detect the magnitude of the inductor current IL flowing across the inductor L. For example, the zero current detector 113b may detect the magnitude of the inductor current IL according to the magnitude of the switch voltage VSW of the switch node NSW. The zero current detector 113b may include a comparator 113b-1 and an offset controller 113b-2.

The comparator 113b-1 may include a first input terminal connected to the switch node NSW, a second input terminal to which the ground voltage is applied, and an output terminal outputting the zero current sensing signal ZCS. The comparator 113b-1 may receive an offset signal OFS from the offset controller 113b-2. The comparator 113b-1 may compare the switch voltage VSW and the ground voltage based on the offset signal OFS. By comparing the switch voltage VSW and the ground voltage, the comparator 113b-1 may determine whether the inductor current IL is lower than "0" as much as a magnitude of an offset current (e.g., an offset current Iofs of FIG. 6) corresponding to the offset signal OFS (e.g., may determine whether the inductor current IL has a negative value and the magnitude of the inductor current IL is the same as the magnitude of the offset signal OFS). In response to that the inductor current IL is lower than "0" as much as the magnitude of the offset signal OFS, the comparator 113b-1 may output the zero current sensing signal ZCS.

The offset controller 113b-2 may provide the offset signal OFS to the comparator 113b-1 based on the control signal NDRV applied to the transistor M2 and the zero current sensing signal ZCS. The offset signal OFS may be a current signal. The magnitude of the offset current corresponding to the offset signal OFS (or the magnitude of the offset signal OFS when the offset signal OFS is a current signal) may be determined in advance in consideration of a capacitance of the parasitic capacitor Cpar, the input power voltage VIN, a duration of a dead time, etc. One approach to the determining of the magnitude of the offset current corresponding to the offset signal OFS will be described hereafter in some additional detail.

The feedback controller 114 may output the feedback signal FB to the PFM generator 111b based on the magnitude of the output power voltage VOUT using the approach described in relation to FIG. 3.

Unlike the switching regulator 100a of FIG. 3, the switching regulator 100b of FIG. 5 may further include the peak current sensor 115. The peak current sensor 115 may be connected to the power switch 101. For example, the peak current sensor 115 may be connected to the first terminal of the transistor M1 of the power switch 101. The peak current sensor 115 may sense the magnitude of the inductor current IL provided by the input terminal IN to the switch node NSW through the transistor M1. The peak current sensor 115 may sense that the magnitude of the inductor current IL is the same as (or approximates) a peak current (e.g., the peak current Ipeak of FIGS. 4 and 6). If the magnitude of the inductor current IL is the same as (or approximates) the peak current Ipeak, the peak current sensor 115 may output the peak current sensing signal PCS to the PFM generator 111b.

Figure 6:
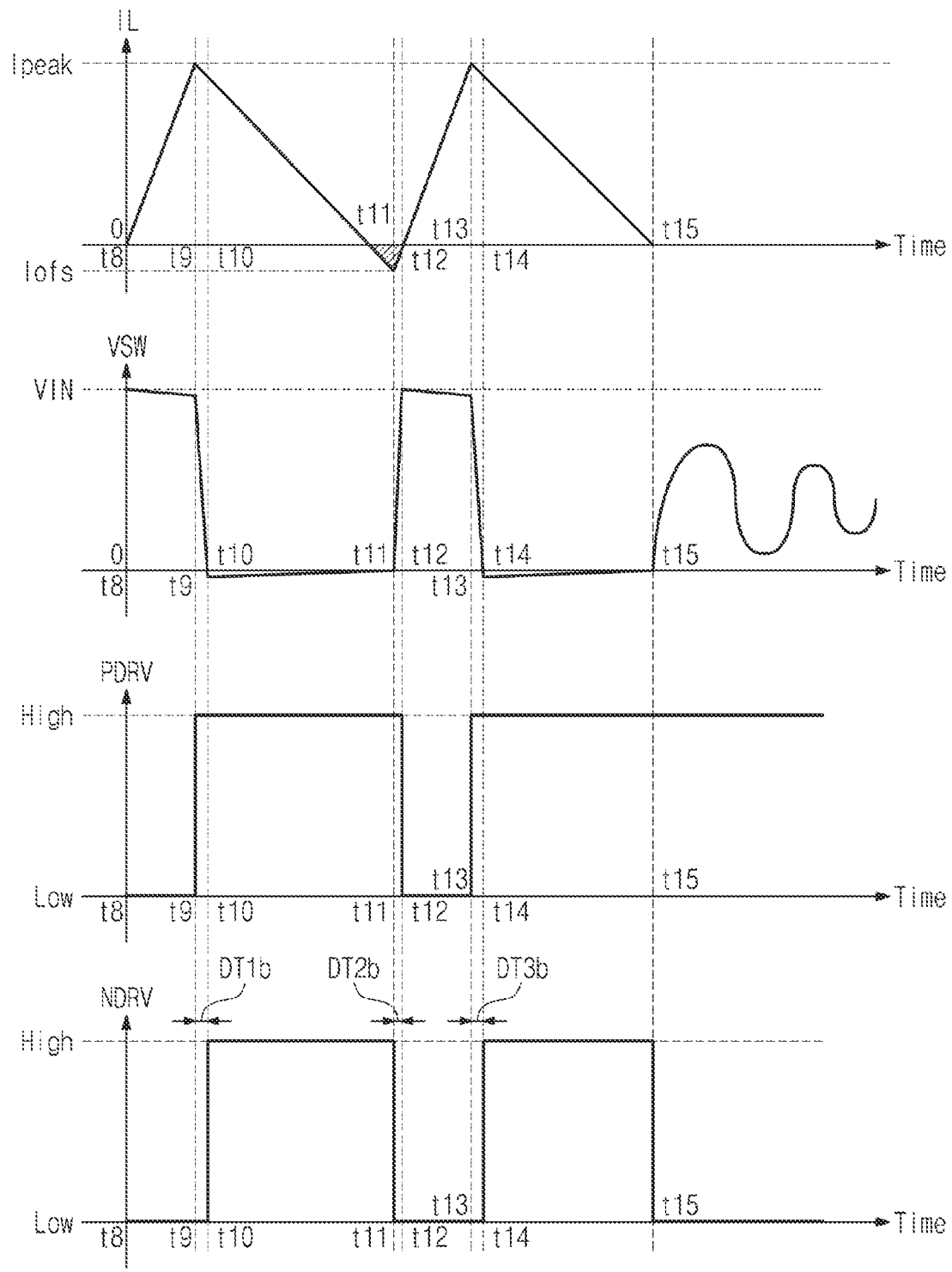
FIG. 6 is a timing diagram illustrating operation of the switching regulator 100b of FIG. 5.

FIG. 6 is a timing diagram illustrating operation of the switching regulator 100b of FIG. 5. Variations in the inductor current IL, the switch voltage VSW, the control signal PDRV, and the control signal NDRV depend on the operation of the switching regulator 100b of FIG. 5.

Referring to FIGS. 1, 2, 5 and 6, at time t8, the magnitude of the inductor current IL may be about 0. As the transistor M1 is turned ON in response to a low control signal PDRV, the magnitude of the switch voltage VSW may be substantially the same as the magnitude of the input power voltage VIN. That is, the magnitude of the switch voltage VSW may approximate to the magnitude of the input power voltage VIN. (Here, it is assumed that the parasitic capacitor Cpar has been sufficiently charged by the input power voltage VIN before time t8). Thereafter, the inductor current IL flowing through the inductor L may increase in response to the switch voltage VSW.

At time t9, the magnitude of the inductor current IL may be the same as the peak current Ipeak. The peak current sensor 115 may detect the magnitude of the inductor current IL and may output the peak current sensing signal PCS to the PFM generator 111b when the magnitude of the inductor current IL is the same as (or approximates) the peak current Ipeak. The PFM generator 111b may generate the signal PFMb for turning OFF the power switch 101 and may apply the generated signal PFMb to the gate driver 112. The control signal PDRV provided by the gate driver 112 to the gate of the transistor M1 may transition from low to high in response to the signal PFMb.

The transistor M1 may be turned OFF in response to a high control signal PDRV. Thereafter, the inductor current IL and the switch voltage VSW may decrease in response to power consumption of the load device LOAD connected to the output terminal OUT of the switching regulator 100b. The power consumption of the load device LOAD may make cause switch voltage VSW to fall below the ground voltage.

Unlike the embodiment illustrated in FIG. 4, in the embodiment illustrated in FIG. 6, the control signal NDRV may transition low to high before the parasitic diode Dpar2 of the transistor M2 is turned ON due to discharge of the parasitic capacitor Cpar. Hence, a duration of a first dead time DT1b of FIG. 6 may be determined according to Equation 1 below:

$$\Delta t_1 = C_{par} V_{in} / I_{peak} \qquad \ldots \text{[Equation 1]}$$

In Equation 1, $\Delta t_1$ may be a duration of the dead time DT1b, $C_{par}$ may be a capacitance of the parasitic capacitor Cpar, $V_{in}$ may be a magnitude of the input power voltage VIN, and $I_{peak}$ may be a magnitude of the peak current Ipeak. Referring to Equation 1, the duration $\Delta t_1$ of the dead time DT1b may be a time period sufficient to discharge charges stored in the parasitic capacitor Cpar. At the same time, the duration $\Delta t_1$ of the dead time DT1b may be a time period insufficient to turn on the parasitic diode Dpar2 of the transistor M2. That is, the first dead time DT1b may end before the parasitic diode Dpar2 of the transistor M2 is turned ON. As such, the transistor M2 may be turned ON after electrical charge associated with the parasitic capacitor Cpar are discharged and before the parasitic diode Dpar2 of the transistor M2 is turned ON. In this case, all of the electrical charge associated with the parasitic capacitor Cpar may be discharged and supplied to the output terminal OUT. Accordingly, power loss due to the parasitic capacitor Cpar may be avoided, and power loss due to the conduction of the parasitic diode Dpar2 may also be avoided.

At time t10, the control signal NDRV provided by the gate driver 112 to the gate of the transistor M2 may transition from low to high. For example, the gate driver 112 may operate such that a high control signal NDRV is applied to the gate of the transistor M2 after the first dead time DT1b following time t9. The transistor M2 may be turned ON in response to a high control signal NDRV, and the ground voltage may be applied to the switch node NSW through the transistor M2. As such, the switch voltage VSW may increase to the ground voltage, and the inductor current IL may decrease. The speed with which the inductor current IL decreases may be proportional to the magnitude of the output power voltage VOUT.

At time t11, the control signal NDRV may transition from high to low. For example, the zero current detector 113b may detect that the switch voltage VSW is the same as (or approximates) the ground voltage. In response to this detection result, the zero current detector 113b may detect that the inductor current IL has a negative direction (i.e., the inductor current IL flows from the output terminal OUT to the switch node NSW through the resistor DCR and the inductor L due to electrical charge stored in the output capacitor Cout) and the magnitude of the inductor current IL is the same as (or approximates) the offset current Iofs. In response to the determination that the inductor current IL has the negative direction, and a simultaneous determination that the magnitude of the inductor current IL is the same as (or approximates) the offset current Iofs, the zero current detector 113b may output the zero current sensing signal ZCS to the PFM generator 111b. The PFM generator 111b may generate the signal PFMb for switching the power switch 101 and may apply the generated signal PFMb to the gate driver 112. The control signal NDRV that is applied from the gate driver 112 to the gate of the transistor M2 may transition from high to low in response to the signal PFMb. As such, unlike the embodiment illustrated in FIG. 4, in the embodiment illustrated in FIG. 6, the control signal NDRV may transition high to low after the inductor current IL has the negative direction.

The transistor M2 may be turned OFF in response to a low control signal NDRV. Unlike the embodiment illustrated in FIG. 4, in the embodiment illustrated in FIG. 6, the parasitic diode Dpar2 associated with the transistor M2 may not be turned ON due to the negative inductor current IL. At the same time, due to the negative inductor current IL, electrical charge may be stored in the parasitic capacitor Cpar of the switch node NSW during a second dead time DT2b. Here, the duration of the second dead time DT2b of FIG. 6 may be determined according to Equation 2 below:

$$\Delta t_2 = C_{par} V_{in} / I_{offset} \qquad \ldots \text{[Equation 2]}$$

In Equation 2, $\Delta t_2$ may be a duration of the second dead time DT2b, $C_{par}$ may be a capacitance of the parasitic capacitor Cpar, $V_{in}$ may be a magnitude of the input power voltage VIN, and $I_{offset}$ may be a magnitude of the offset current Iofs. Referring to Equation 2, the duration $\Delta t_2$ of the second dead time DT2b may be sufficient to electrically charge the parasitic capacitor Cpar in response to the inductor current IL, such that the switch voltage VSW of the switch node NSW increases to about the input power voltage VIN.

During the second dead time DT2b, the inductor current IL may have a negative direction based on electrical charge stored in the output capacitor Cout. That is, the inductor current IL may flow from the output terminal OUT to the switch node NSW in response to the energy stored in the output capacitor Cout. Accordingly, in a case wherein the duration of the second dead time DT2b is excessively long, because the transistor M1 is capable of being turned ON, a time necessary to charge the output capacitor Cout may become long, thereby making the efficiency of the switching regulator 100b low. In contrast, in a case where the duration of the second dead time DT2b is excessively short, the parasitic capacitor Cpar may not become sufficiently charged.

In some embodiments, in response to the magnitude $V_{in}$ of the input power voltage VIN determined in advance and the capacitance $C_{par}$ of the parasitic capacitor Cpar, there may be variously combined the duration $\Delta t_2$ of the second dead time DT2b and the magnitude $I_{offset}$ of the offset current Iofs. Based on these possible combinations, the duration $\Delta t_2$ of the second dead time DT2b and the magnitude $I_{offset}$ of the offset current Iofs may be determined through the routine experimentation and/or simulation.

At time t12, the control signal PDRV provided by the gate driver 112 to the gate of the transistor M1 may transition from high to low. For example, the gate driver 112 may operate such that a low he control signal PDRV is applied to the gate of the transistor M1 after the second dead time DT2b following time t11. The transistor M1 may be turned ON in response to a low control signal PDRV, and the input power voltage VIN may be applied to the switch node NSW through the transistor M1.

Unlike the embodiment illustrated in FIG. 4, in the embodiment illustrated in FIG. 6, the parasitic capacitor Cpar may be charged during the second dead time DT2b, such that the switch voltage VSW of the switch node NSW approximates to the input power voltage VIN. As such, power loss due to the recharging of the parasitic capacitor Cpar when the transistor M1 is turned ON may be avoided.

At time t13, the magnitude of the inductor current IL may be the same as (or approximate) the peak current Ipeak. Consistent with the description related to time t8, the control signal PDRV provided by the gate driver 112 to the gate of the transistor M1 may transition from low to high. The transistor M1 may be turned OFF in response to a high control signal PDRV. Thereafter, the inductor current IL and the switch voltage VSW may decrease in response to power consumption by the load device LOAD connected to the output terminal OUT of the switching regulator 100b. Power consumption by the load device LOAD may cause the switch voltage VSW to fall below the ground voltage.

As in the duration of the first dead time DT1b, a duration of a third dead time DT3b may be determined according to Equation 1. As a result, as in the first dead time DT1b, all electrical charge associated with the parasitic capacitor Cpar may be discharged during the third dead time DT3b, and simultaneously, the parasitic diode Dpar2 of the transistor M2 may be prevented from being turned ON. Accordingly, power loss due to the parasitic capacitor Cpar and the power loss due to the conduction of the parasitic diode Dpar2 may be avoided.

At time t14, the control signal NDRV provided by the gate driver 112 to the gate of the transistor M2 may transition from low to high. For example, the gate driver 112 may operate such that a high control signal NDRV is applied to the gate of the transistor M2 after the third dead time DT3b following the time t13. The transistor M2 may be turned ON in response to a high control signal NDRV, and the ground voltage may be applied to the switch node NSW through the transistor M2. As such, the switch voltage VSW may increase to the ground voltage, and the inductor current IL may decrease.

At time t15, the control signal NDRV provided by the gate driver 112 to the gate of the transistor M2 may transition from high to low. For example, in response to the feedback signal FB, the PFM generator 111b may determine that the output power voltage VOUT of the switching regulator 100b is the same as (or approximates) the target voltage. The power switch 101 may be controlled by the gate driver 112 based on a determination result, so as not to be switched any longer. For example, following time t15, the transistors M1 and M2 may maintain a turned-OFF state. As such, the inductor current IL may decrease to a value of 0, and the switch voltage VSW may also transiently converge. Thereafter, the power switch 101 may be again switched when the output power voltage VOUT is lower than the target voltage.

In some embodiments, the switching regulator 100b of FIG. 5 may be understood as performing soft switching. For example, when the power switch 101 is switched (e.g., when the transistors M1 and M2 are turned ON/OFF), the parasitic capacitor Cpar of the switch node NSW may be charged/discharged by the inductor current IL flowing through the inductor L, instead of a current based on the input power voltage VIN.

Figure 7:
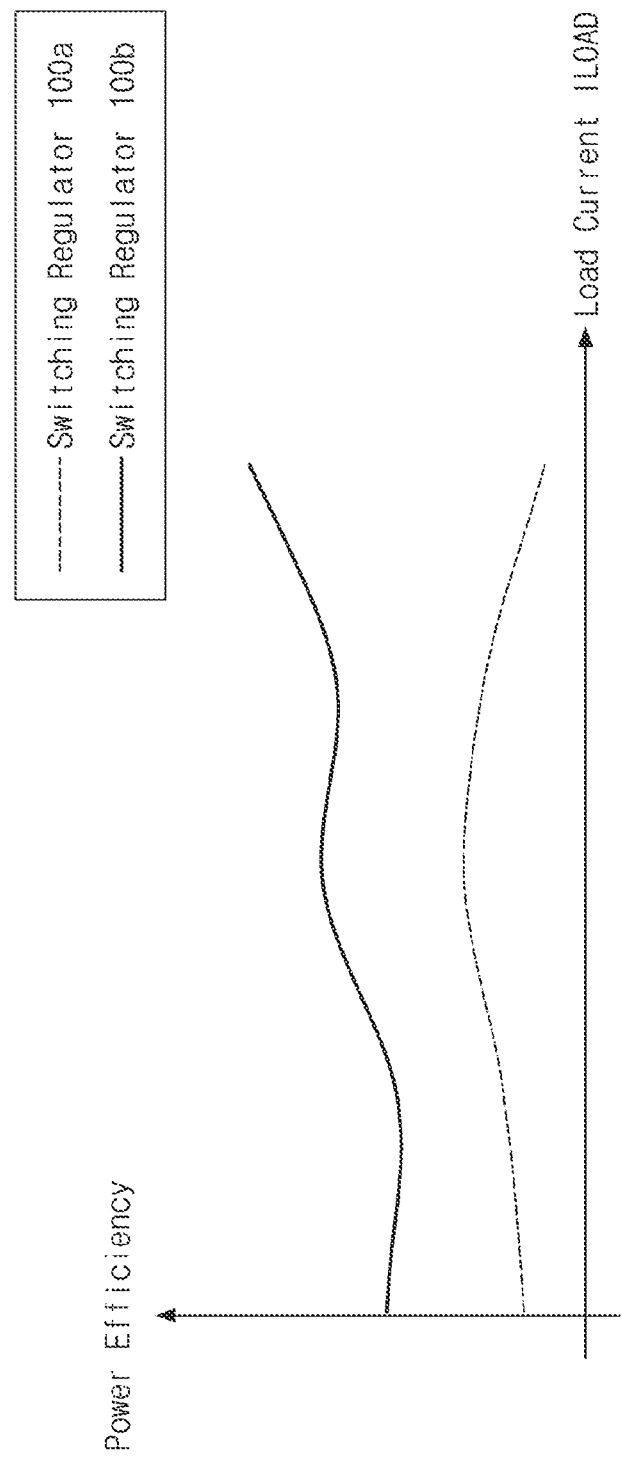
FIG. 7 is a graph illustrating power efficiency changes as a function of load current for the switching regulator 100a of FIG. 3 and the switching regulator 100b of FIG. 5.

FIG. 7 is a graph illustrating power efficiency as a function of load current ILOAD for each of the switching regulator 100a of FIG. 3 and the switching regulator 100b of FIG. 5. Here, power efficiency may be understood as a ratio of input power voltage supplied to each of the switching regulators 100a and 100b and output power voltage correspondingly provided by each of the switching regulators 100a and 100b.

As the magnitude of the load current ILOAD increases, the amount of power required by the load device LOAD also increases. The power switch 101 may perform a switching operation at a higher frequency for the purpose of increasing the magnitude of the load current ILOAD.

As described above, in the switching regulator 100a, when the transistors M1 and M2 of the power switch 101 are turned OFF and then turned ON again, power loss due to the discharging and recharging of the parasitic capacitor Cpar and the power loss due to the conduction of the parasitic diode Dpar2 may occur. Accordingly, as illustrated in FIG. 7, as the magnitude of the load current ILOAD increases, the switching frequency of the power switch 101 may increase, thereby causing a decrease of the power efficiency of the switching regulator 100a. In contrast, in the switching regulator 100b, because power loss due to discharging and recharging of the parasitic capacitor Cpar and the conduction of the parasitic diode Dpar2 are avoided when the switching of the power switch 101 is performed, even though the magnitude of the load current ILOAD increases, the power efficiency of the switching regulator 100b may not decrease.

Figure 8:
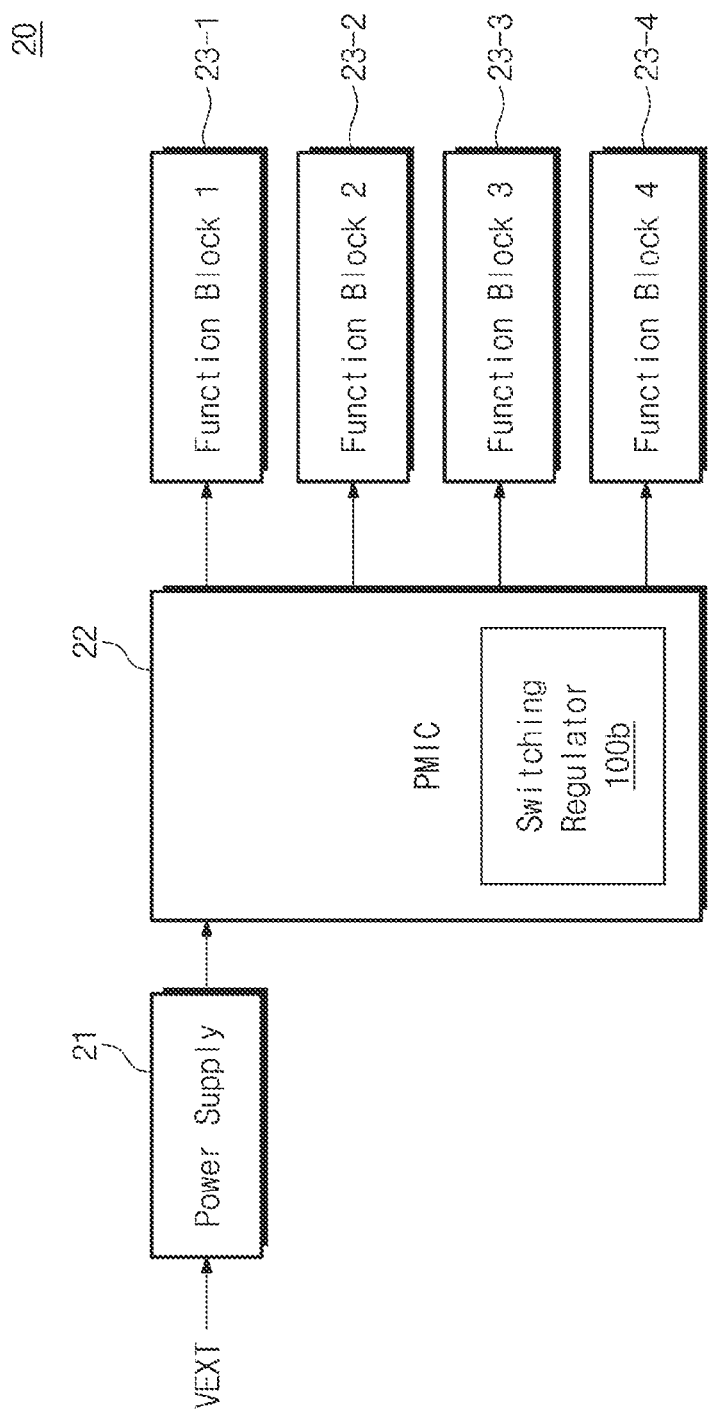
FIG. 8 is a block diagram illustrating a system 20 including a PMIC according to embodiments of the inventive concept.

FIG. 8 is a block diagram illustrating a system 20 according to embodiments of the inventive concept. Referring to FIG. 8, the system 20 may include a power supply 21 and a PMIC 22, as well as an arbitrary number (e.g., 4) and type(s) of function blocks (e.g., 23-1, 23-2, 23-3, and 23-4).

The power supply 21 may provide an input power voltage to the PMIC 22 in response to an externally provide voltage VEXT. The PMIC 22 may supply one or more output power voltages to each of the function blocks 23-1, 23-2, 23-3, and 23-4 in response to input power voltage received from the power supply 21. In some embodiments, the system 20 may include a battery, and the external voltage VEXT supplied to the power supply 21 may be a battery-supplied voltage. Alternately, in some embodiments, the system 20 may be supplied with power from a power line, and the external voltage VEXT may be a voltage generated from power supplied through the power line. For example, the external voltage VEXT may be the voltage of the power line, or may be a DC voltage generated by rectifying an AC voltage supplied from the power line.

The PMIC 22 may include the switching regulator 100*b* of FIG. 5. Thus, the PMIC 22 may convert the input power voltage received from the power supply 21 using the switching regulator 100*b*, and may supply converted voltage(s) to at least one of the function blocks 23-1, 23-2, 23-3, and 23-4.

Each of the function blocks 23-1, 23-2, 23-3, and 23-4 may operate in response to power provided from the PMIC 22. For example, one of the function blocks 23-1, 23-2, 23-3, and 23-4 may be a digital circuit, which processes a digital signal, such as an application processor (AP), an analog circuit, which processes an analog signal, such as an amplifier, or a circuit, which processes a mixed signal, such as an analog-to-digital converter (ADC).

Figure 9:
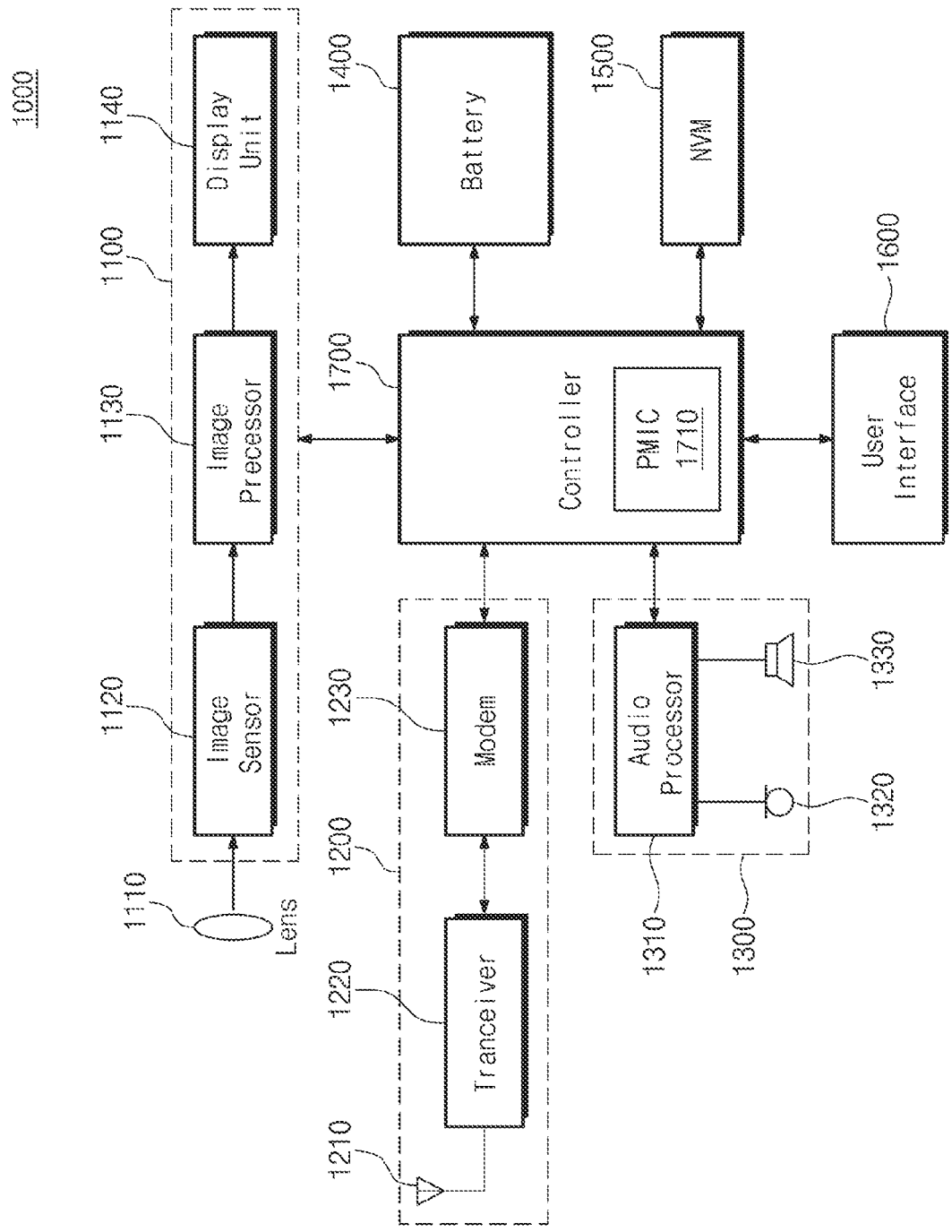
FIG. 9 is a block diagram illustrating an electronic device 1000 having a controller 1700 including a PMIC according to embodiments of the inventive concept.

FIG. 9 is a block diagram illustrating an electronic device 1000 according to embodiments of the inventive concept. Referring to FIG. 9, the electronic device 1000 may include an image processing unit 1100, a wireless transceiver unit 1200, an audio processing unit 1300, a battery 1400, a nonvolatile memory device 1500, a user interface 1600, and a controller 1700. The electronic device 1000 may operate under control of the controller 1700.

The image processing unit 1100 may include a lens 1110, an image sensor 1120, an image processor 1130, and a display unit 1140. The image processor 1130 may convert a real image into image data through the lens 1110 and the image sensor 1120. The display unit 1140 may display an image data signal generated by the image processor 1130 or image data to be provided to the user. The display unit 1140 may be implemented with a liquid crystal display (LCD) or organic light emitting diodes (OLED). In the case of implementing the LCD or OLED in a touch screen manner, the display unit 1140 may operate together with the user interface 1600.

The wireless transceiver unit 1200 includes an antenna 1210, a transceiver 1220, and a modulator/demodulator (modem) 1230. The wireless transceiver unit 1200 may perform a wireless communication function. The transceiver 1220 may adjust a frequency of a signal to be transmitted through the antenna 1210 or may amplify the signal to be transmitted; the transceiver 1220 may adjust a frequency of a signal received through the antenna 1210 or may amplify the received signal. The modem 1230 may include a transmitter encoding and modulating a signal to be transmitted, and a receiver decoding and demodulating a signal received through the antenna 1210.

The audio processing unit 1300 includes an audio processor 1310, a microphone 1320, and a speaker 1330. The audio processing unit 1300 may constitute a codec, and the codec may include a data codec and an audio codec. The data codec may process packet data, and the audio codec may process an audio signal such as voice and multimedia files. Also, the audio processing unit 1300 may perform a function of converting and reproducing a digital audio signal received through the modem 1230 into an analog signal through the audio codec or converting an analog audio signal generated by the microphone 1320 into a digital audio signal so as to be transmitted to the modem 1230. The codec may be provided separately or may be included in the controller 1700.

The nonvolatile memory device 1500 may be implemented with a memory card (e.g., a multimedia card (MMC), an embedded MMC (eMMC), a secure digital (SD) card, or a micro SD card) and the like according to an embodiment of the inventive concept. In addition, the controller 1700 may be provided as a system-on-chip (SoC) that drives an application program, an operating system, etc. The controller 1700 may include a PMIC 1710. The PMIC 1710 may be supplied with a voltage from the battery 1400 and may convert a level of the supplied voltage. The PMIC 1710 may include the switching regulator 100*b* of FIG. 6.

A switching regulator according to embodiments of the inventive concept may include a power switch that provides a switch voltage to a switch node in response to an input power voltage and ground voltage. When the power switch is switched, switching may be performed, at least in part, using electrical charge stored in a parasitic capacitor in order to prevent a parasitic diode associated with the power switch from being turned ON. As such, a switching regulator exhibiting reduced switching loss and better power efficiency may be provided.

While the inventive concept has been described with reference to embodiments thereof, it will be apparent to those of ordinary skill in the art that various changes and modifications may be made thereto without departing from the spirit and scope of the inventive concept as set forth in the following claims.

What is claimed is:

1. A switching regulator comprising:
an inductor connected to a switch node;
a power switch connected to the switch node and configured to apply a first voltage to the switch node in response to a first control signal and to apply a second voltage to the switch node in response to a second control signal;
a zero current detector configured to provide a zero current sensing signal when an inductor current flowing through the inductor is an offset current;
a controller configured to generate the first control signal and the second control signal based on a pulse frequency modulation signal and configured to control a first duration of a first dead time and a second duration of a second dead time;
a peak current sensor configured to provide a peak current sensing signal when the inductor current flowing through the inductor reaches a peak current; and
a pulse frequency modulation generator configured to output the pulse frequency modulation signal to the controller based on the zero current sensing signal, the peak current sensing signal, and a reference voltage,
wherein the zero current detector includes:
a comparator configured to compare a switch voltage of the switch node and a ground voltage and provide the zero current sensing signal based on an offset signal, and
an offset controller configured to output the offset signal to the comparator based on the zero current sensing signal and the second control signal,
wherein a magnitude of the offset current is based on the offset signal,
wherein the second control signal transitions from low to high following the first dead time after the first control signal transitions from low to high,
wherein the first control signal transitions from high to low following the second dead time after the second control signal transitions from high to low level, and wherein the inductor current flows in a first direction during the first dead time and in a second direction, different from the first direction, during the second dead time.

2. The switching regulator of claim 1, wherein the first control signal transitions from low to high when the inductor current reaches the peak current, and
wherein the first duration of the first dead time is based on a capacitance of a parasitic capacitor associated with the switch node, a magnitude of the first voltage, and a magnitude of the peak current.

3. The switching regulator of claim 1, wherein the power switch comprises:
a first transistor including a first terminal receiving the first voltage, a gate receiving the first control signal, and a second terminal connected to the switch node; and
a second transistor including a first terminal connected to the switch node, a gate receiving the second control signal, and a second terminal receiving the second voltage,
wherein the controller is configured to control the first duration of the first dead time such that the first dead time ends before a parasitic diode associated with the second transistor is turned ON.

4. The switching regulator of claim 1, wherein the second control signal transitions from high to low when the inductor current is the offset current, and
wherein the second duration of the second dead time is based on a capacitance of a parasitic capacitor associated with the switch node, a magnitude of the first voltage, and a magnitude of the offset current.

5. The switching regulator of claim 1, wherein a magnitude of a voltage of the switch node is the same as a magnitude of the first voltage following the second dead time after the second control signal transitions from high to low.

6. The switching regulator of claim 1, further comprising:
an output capacitor charged in response to the inductor current,
wherein, during the second dead time, the inductor current flows from the output capacitor to a parasitic capacitor associated with the switch node through the inductor and the switch node.

7. A switching regulator converting an input power voltage into an output power voltage, the switching regulator comprising:
an inductor connected to a switch node;
a power switch including a first transistor applying the input power voltage to the switch node in response to a first control signal and a second transistor applying a ground voltage to the switch node in response to a second control signal;
a peak current sensor configured to provide a peak current sensing signal when an inductor current flowing through the inductor reaches a peak current;
a zero current detector configured to provide a zero current sensing signal when the inductor current is an offset current;
a feedback controller configured to compare the output power voltage and a target voltage and provide a corresponding feedback signal;
a pulse frequency modulation generator configured to provide a pulse frequency modulation signal based on the peak current sensing signal, the zero current sensing signal, the feedback signal, and a reference voltage; and
a gate driver configured to provide the first control signal and the second control signal based on the pulse frequency modulation signal,
wherein the first transistor and the second transistor are turned OFF during a first dead time after the inductor current reaches the peak current,
the first transistor and the second transistor are turned OFF during a second dead time after the inductor current reaches the offset current, and
a direction of the peak current and a direction of the offset current are opposite to each other, and
wherein the zero current detector comprises:
a comparator configured to compare a switch voltage of the switch node and ground voltage and provide the zero current sensing signal in response to an offset signal, and
an offset controller configured to output the offset signal to the comparator in response to the zero current sensing signal and the second control signal, wherein a magnitude of the offset current is based on the offset signal.

8. The switching regulator of claim 7, wherein a first duration of the first dead time corresponds to a ratio of a product of a capacitance of a parasitic capacitor associated with the switch node and a magnitude of the input power voltage to a magnitude of the peak current.

9. The switching regulator of claim 7, wherein during the first dead time, the inductor current flows to the inductor through the switch node.

10. The switching regulator of claim 7, wherein the first dead time ends before a parasitic diode associated with the second transistor is turned ON.

11. The switching regulator of claim 7, wherein a second duration of the second dead time corresponds to a ratio of a product of a capacitance of a parasitic capacitor associated with the switch node and a magnitude of the input power voltage to a magnitude of the offset current.

12. The switching regulator of claim 7, wherein a magnitude of a voltage of the switch node is the same as a magnitude of the input power voltage following the second dead time after the inductor current reaches the offset current.

13. A power management integrated circuit comprising:
a switching regulator configured to convert an input power voltage into an output power voltage,
wherein the switching regulator includes:
an inductor connected to a switch node;
a power switch connected to the switch node and configured to apply a first voltage to the switch node in response to a first control signal and to apply a second voltage to the switch node in response to a second control signal;
a microcontroller configured to generate the first control signal and the second control signal based on a pulse frequency modulation signal and configured to control a first duration of a first dead time and a second duration of a second dead time;
a peak current sensor configured to provide a peak current sensing signal when an inductor current flowing through the inductor reaches a peak current;
a zero current detector configured to provide a zero current sensing signal when the inductor current flowing through the inductor is an offset current;
a feedback controller configured to compare the output power voltage and a target voltage and provide a feedback signal based on the comparison between the output power voltage and the target voltage; and a pulse frequency modulation generator configured to output the pulse frequency modulation signal to the microcontroller based on the peak current sensing signal, the zero current sensing signal, the feedback signal, and a reference voltage, wherein the second control signal transitions from low to high following the first dead time after the first control signal transitions from low to high, the first control signal transitions from high to low following the second dead time after the second control signal transitions from high to low, the inductor current flows in a first direction during the first dead time and in a second direction, different from the first direction, during the second dead time, and wherein the zero current detector includes:
  a comparator configured to compare a switch voltage of the switch node and ground voltage and provide the zero current sensing signal based on an offset signal; and
  an offset controller configured to output the offset signal to the comparator based on the zero current sensing signal and the second control signal,
  wherein a magnitude of the offset current is based on the offset signal.

14. The power management integrated circuit of claim 13, wherein the first control signal transitions from low to high when the inductor current reaches a peak current, and the first duration of the first dead time corresponds to a ratio of a product of a capacitance of a parasitic capacitor associated with the switch node and a magnitude of the first voltage to a magnitude of the peak current.

15. The power management integrated circuit of claim 13, wherein the power switch includes:
  a first transistor including a first terminal receiving the first voltage, a gate receiving the first control signal, and a second terminal connected to the switch node; and
  a second transistor including a first terminal connected to the switch node, a gate receiving the second control signal, and a second terminal receiving the second voltage,
  wherein the microcontroller is configured to control the first duration of the first dead time such that the first dead time ends before a parasitic diode associated with the second transistor is turned ON.

16. The power management integrated circuit of claim 13, wherein the second control signal transitions from high to low when the inductor current is the offset current, and
  wherein the second duration of the second dead time corresponds to a ratio of a product of a capacitance of a parasitic capacitor associated with the switch node and a magnitude of the first voltage to a magnitude of the offset current.

17. The power management integrated circuit of claim 13, wherein a magnitude of a voltage of the switch node is the same as a magnitude of the first voltage following the second dead time after the second control signal transitions from high to low.

* * * * *